June 9, 1959　　　　W. SCHROEDER　　　　2,889,755
MACHINE TOOL TRANSMISSION
Filed Aug. 11, 1955　　　　　　　　　　　3 Sheets-Sheet 1

INVENTOR.
WALTER SCHROEDER.
BY
H. K. Parsons & C. W. Wright.
ATTORNEYS.

June 9, 1959  W. SCHROEDER  2,889,755
MACHINE TOOL TRANSMISSION
Filed Aug. 11, 1955  3 Sheets-Sheet 2
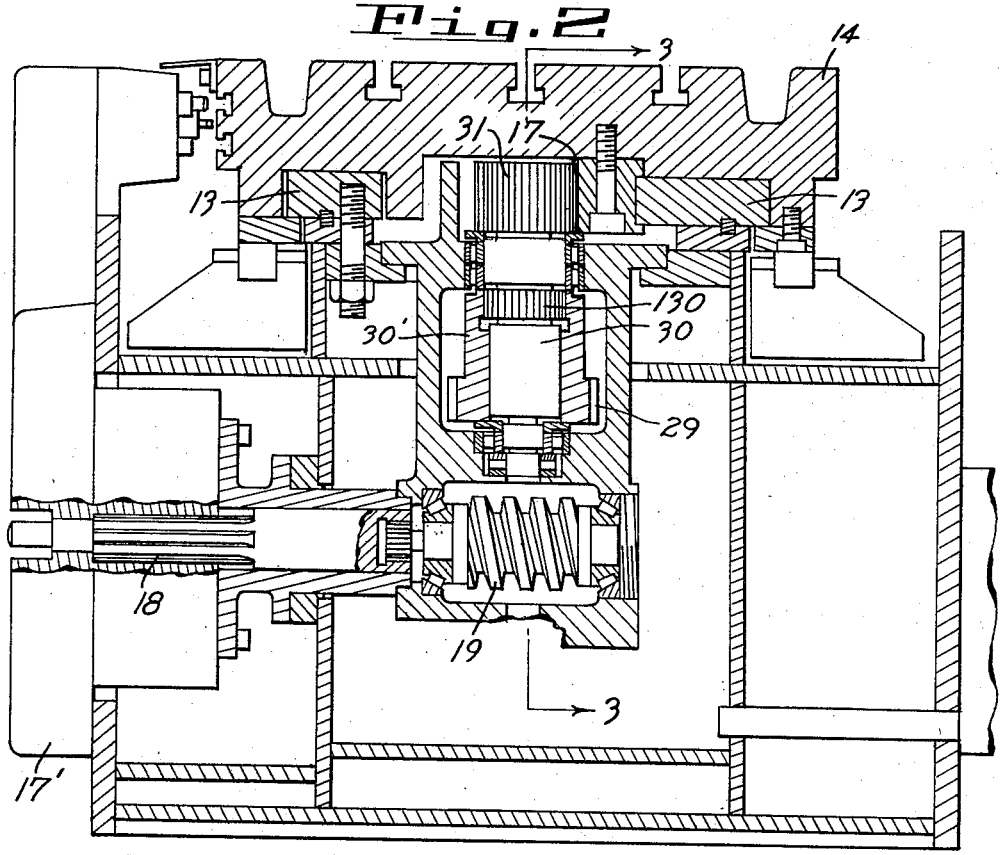
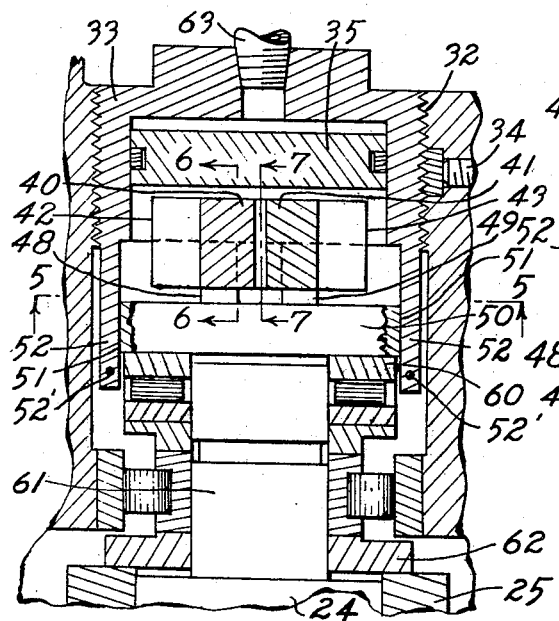
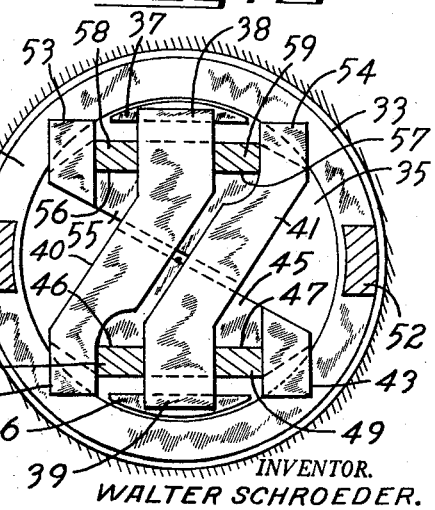
INVENTOR.
WALTER SCHROEDER.
BY
*H. H. Parsons & L. W. Wright*
ATTORNEYS.

June 9, 1959 W. SCHROEDER 2,889,755
MACHINE TOOL TRANSMISSION
Filed Aug. 11, 1955 3 Sheets-Sheet 3
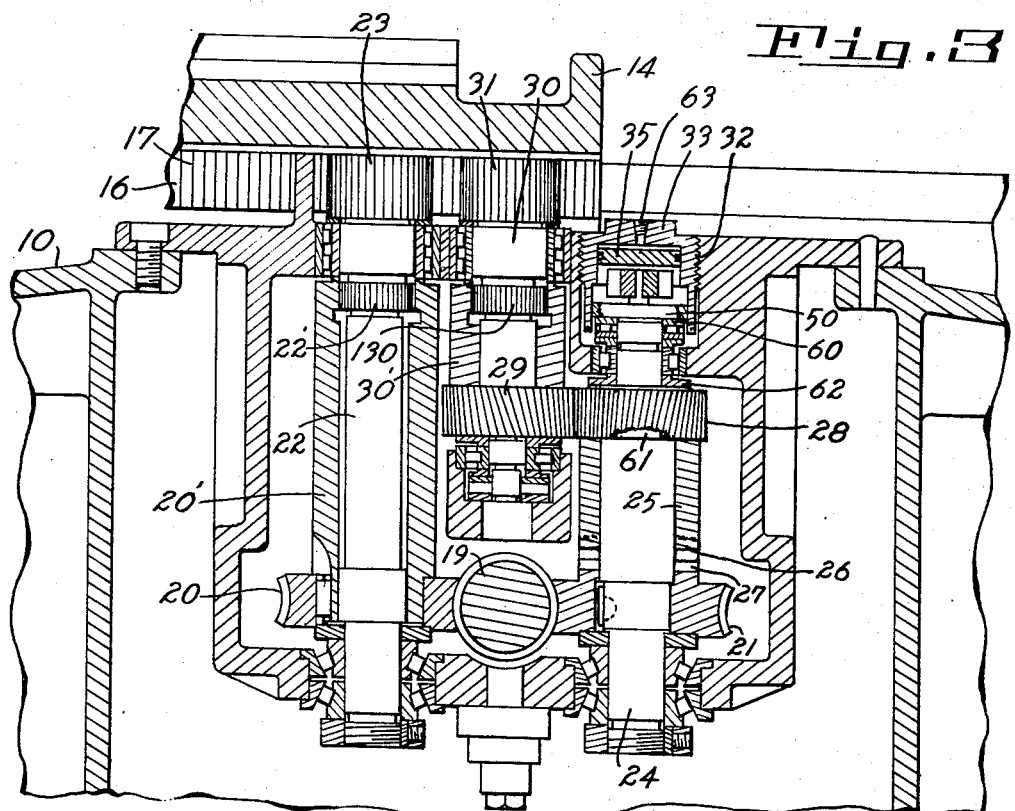
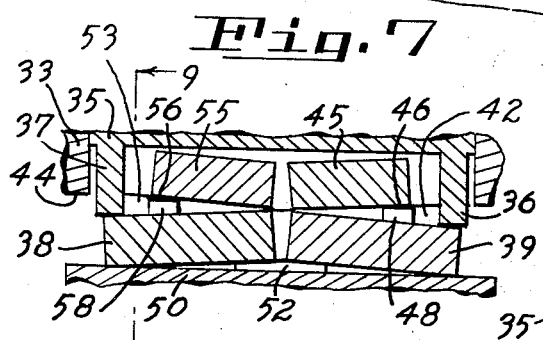
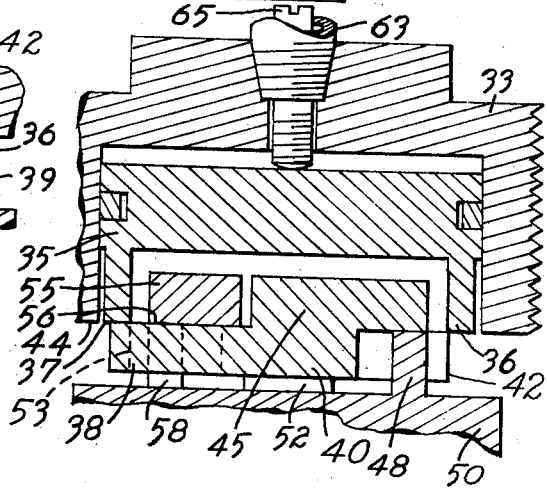
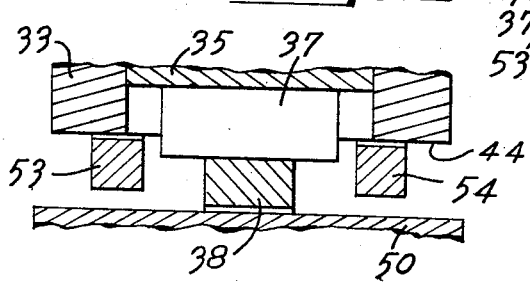
INVENTOR.
WALTER SCHROEDER.
BY
ATTORNEYS.

United States Patent Office 2,889,755
Patented June 9, 1959

2,889,755
MACHINE TOOL TRANSMISSION

Walter Schroeder, Cincinnati, Ohio, assignor to The Cincinnati Milling Machine Co., Cincinnati, Ohio, a corporation of Ohio Application August 11, 1955, Serial No. 527,676

10 Claims. (Cl. 90—22)

This invention relates to improvements in machine tool transmissions and has particular reference to an improved control transmission adapted for utilization in connection with milling machines or the like.

One of the principal objects of the present invention is the provision of an improved form of drive transmission for a translatable element such as the table of a milling machine which will minimize any play or backlash in the transmission drive and maintain a steady movement of the table or slide during the performance of either conventional up milling or climb milling operations, or in those conditons in which the cutter may have a variable reaction on the work of alternative acceleration and deceleration of the table or slide movement during milling or tooling operations with either high speed steel or sintered carbide cutters.

A further object of the present invention is the provision of a transmission of this character in which the application of the backlash minimizing effect is controllable so that the same may be utilized during the milling or tooling portion of the operation but readily released to facilitate rapid traverse or non-tooling movements of the slide.

Another object of the invention is the provision of a structure of this character which may be readily and accurately adjusted to vary the reaction effects of the backlash controller.

An additional object of the present invention is the provision of an improved pressure controllable backlash eliminating mechanism having the capacity of applying an amplified positioning pressure to a movable member of the transmission of limited amount, together with a continuing steadying pressure of lesser amount and in which both the primary and secondary pressure reactions may be readily released to free the transmission mechanism from said pressure restraints as when operating under high speed or rapid traverse conditions.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 3 is a fragmentary longitudinal section on the line 3—3 of Figure 2.

Figure 4 is an enlarged fragmentary section of the backlash pressure device.

Figure 5 is a transverse section on the line 5—5 of Figure 4 viewing the pressure lever control mechanism from the lower side.

Figure 6 is a section on the line 6—6 of Figure 4 looking in the direction of the arrows, and Figure 7 is a transverse section on line 7—7 of Figure 4 showing the relationship of the parts when the pressure is applied.

Figure 8 is a diagrammatic view of the hydraulic control circuit for table operation and backlash control.

Figure 9 is a transverse section taken on line 9—9 of Figure 7.

Figure 1:
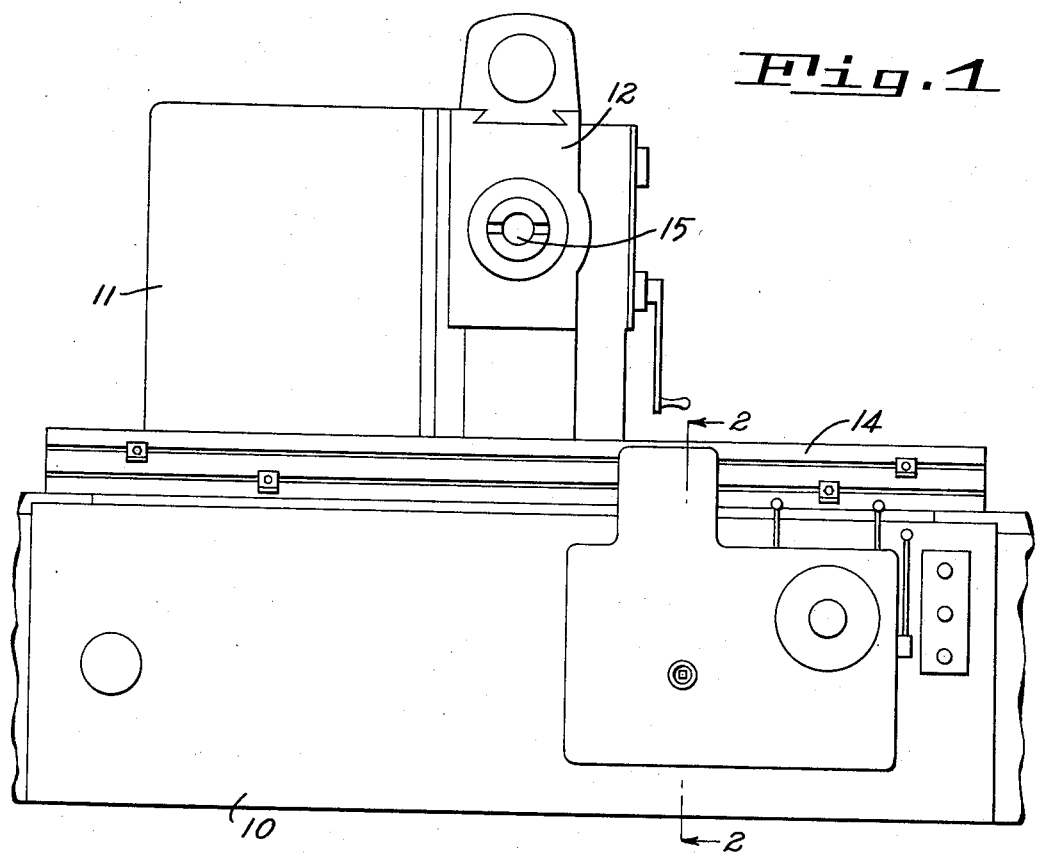
Figure 1 is a front elevation of a machine embodying the present invention.

In the drawings the numeral 10 designates the bed or support of a milling machine having a column 11 mounting the spindle carrier 12 and provided with ways 13 on which is translatably mounted the work support or table 14.

The spindle carrier 12 carries the cutter spindle 15 on which in conventional manner is mounted a cutter for operation on a work piece carried by the table 14 and the table is translated or longitudinally moved to shift the work relative to the cutter.

Figure 2:
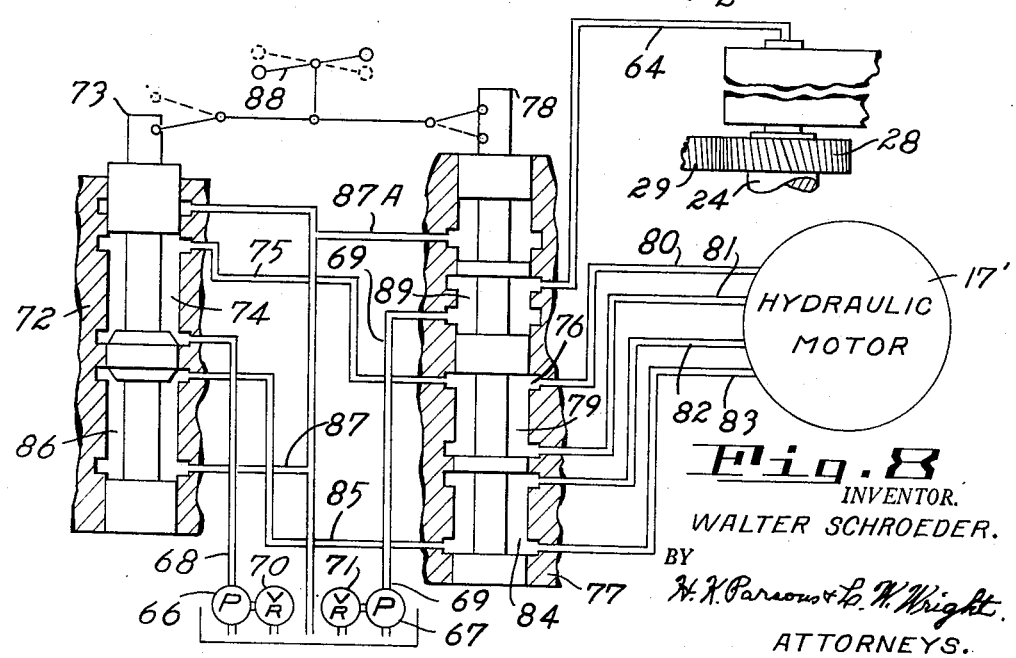
Figure 2 is a transverse section on the line 2—2 of Figure 1.

For effecting this shifting or translation of the table it is provided with a longitudinally extending rack 16 having the rack teeth 17 as particularly indicated in Figures 2 and 3 of the drawings.

Mounted in the bed or support is the table drive mechanism including the hydraulic or other drive motor 17' actuating the horizontal shaft 18 carrying the worm 19 which extends between and is in mesh with the worm gears 20 and 21. Worm gear 20 is secured on torque sleeve 20' interlocking with multispline member 22' on vertical shaft 22. This shaft 22 is mounted in the bed in suitable bearings and has at its upper end the pinion 23 meshing with teeth 17 of the table drive rack 16. Rotation of pinion 23 by motor 17' in one direction or the other serves correspondingly to move the table 14 with respect to the bed 10.

Worm gear 21 is keyed on shaft 24 which is journaled in suitable bearings in the bed or support 10 and has slidably mounted thereon sleeve 25 connected by the sliding clutch teeth 26 to the teeth 27 on the hub of gear 21 as particularly illustrated in connection with Figure 3. This sleeve bears at its upper end the helical gear 28 meshing with a second helical gear 29 carried by the sleeve 30' splined at 130 to the stub shaft 30 which is journaled in the bed 10 and bears at its upper end the pinion 31 which meshes with the teeth 17 of rack 16.

In the operation of the machine, if pinion 23 is operated in a counterclockwise direction, looking down on the transmission from the top, it will be evident that it will react against the right hand side of the rack teeth 17 moving the table 14 toward the left. At the same time shaft 30 and its pinion 31 will be rotated in a counterclockwise direction and at a rate corresponding to the rate of rotation of shaft 22 and pinion 23. It is a recognized fact that, in the commercial production of large and heavy parts, such as used in milling machines of the type here shown, having heavily proportioned components and requiring, for example, 50 h.p. for their operation under machining conditions, the dimensional tolerances in manufacture of elements such as rack 16 and pinions 23 and 31 are such that in normal assembly a slight play may exist between these parts. Machines of this character are employed for taking either heavy conventional milling cuts in which the direction of rotation of the cutter tends to retard the movement of the table or for milling operations in which the direction of rotation of the cutter tends to accentuate the movement of the table. Also, in some milling conditions the entire operation may include both types of cut reaction. For maximum satisfactory operation it is necessary that a machine of this sort have minimized backlash in the drive so that work movement will be steady irrespective of the direction of cutter operation, and chatter or other deleterious effects eliminated. In a structure such as here shown, this result can be accomplished by applying adequate downward positional urge to the gear 28 so that its helical teeth reacting against the helical teeth of gear 29 will effect a clockwise orientation movement of pinion 31 relative to pinion 23. This will cause teeth of pinion 31 to engage firmly with the left hand side of teeth 17 on the rack in opposition to the engagement of the teeth of pinion 23 with the right hand side of said teeth 17, automatically minimizing any backlash or play between the rack 16 on the one hand and the pinions 23 and 31 on the other. In other words, with the elements so set up, during all machining operations and irrespective of the direction of feed of the table, one of the pinions will be maintained in positive engagement with one side of the rack teeth and the other pinion with the opposite side of the rack teeth so that the rack is positively held by the pinions without backlash and may be progressed at the rate determined by the pushing of the teeth of one pinion against the rack and the releasing movement of the opposite pinion.

This opposed tightening of the pinions, however, against the rack, creates a certain frictional resistance to movement of the table due to the interfitting of the parts, and it is desirable that this resistance be released when effecting rapid non-tooling relative movements of the work and table. In connection with the present invention this application of pressure or movement axially to the gear 28 or release of pressure is hydraulically effected, said invention relating in part to the particular mechanism for control of these pressure conditions as is illustrated in detail in the several figures of the drawings. Referring particularly to Figures 3 and 4, it will be noted that the bed 10 is provided with an internally threaded bore or aperture at 32 adjustably mounting the threaded cylinder 33 which may be suitably secured in adjusted position by the set screw or corresponding mechanism 34. Slidable in the cylinder is the piston 35 having the depending arcuate lugs 36 and 37 for engagement with the ends 38 and 39 of the pressure levers 40 and 41. It will be noted that these levers are similar in form, configuration and functioning, each being of substantially Y shape. Each lever consists basically of a triangular flat plate 45 and 55 respectively as shown in Figure 5 and forming the large part of the Y, it being remembered that this view shows the bottom surfaces of these parts, while the top surfaces of 45 and 55 are in the same plane as shown in Figure 6. The bottom surfaces of these two plates are shown in Figure 5 for a number of integral square cornered lugs projecting downwardly therefrom. The depth of all of these lugs is approximately equal to the thickness of the plate as shown in Figure 6. The plate 45 has the lug or lever 40 projecting from the bottom face thereof and may be defined as the pressure lever 40, and it will be noted from Figures 5 and 6 that it extends beyond the edge of the triangular plate 45 like a cantilever arm and in overlying relation to the plate 55, thus forming the stem of the Y, so that its end 38 engages the bottom surface of the arcuate lug 37 of the piston 35. Although Figure 5 is a view looking up from the bottom the lug 37 actually rests on the end of the lever arm 40 as clearly shown in the left side of Figure 6 so that downward movement of the piston will rock the lever.

The some construction applies to the plate 55 and its integral lug or lever arm 41. In fact, these two parts are made exactly the same but one is turned around 180 degrees with respect to the other when they are assembled. Thus, the lever arm 41, which is integral with the plate or surface 45 for about half its length, extends beyond the surface 55 like a cantilever arm overlapping the surface or plate 45 so that its end 39 engages the arcuate lug 36 of the piston 35. Here again, the lug 36 actually rests on the end of the lever arm 41 for actuation thereof. The plate 45 provides seats at 46 and 47 for the lugs 48 and 49 projecting upwardly from the upper face of the pressure plate 50. It will now be seen that the lever 40 bears at an intermediate point on the pressure plate 50 with one end fulcrumed under the bottom of the cylinder wall and the other end engaged by the lug 37 of the piston whereby downward movement of the piston will rock the lever about its fulcrumed ends 42, 43 and push down the pressure plate 50 by contact with its lugs 48 and 49 and with a mechanical advantage because the length of the lever arm from the fulcrum 42 to the end 38 is much greater than the length of the lever arm from the fulcrum 42 to the lug 46 as an example. The plate 45 has a second lug 43 projecting therefrom in spaced relation to the end 42 of the lever 40 and symmetrically related thereto.

Each of these lugs 42 and 43 extend beyond the limits of plate 45 and into engagement with the end surface 44 of the cylinder 33. This is clearly shown in Figure 9 where the corresponding lugs 53 and 54 of plate 55 project underneath the end of cylinder 33 into engagement with the surface 44. Since the surface 44 is fixed it forms a fixed fulcrum about which the levers rotate.

The pressure plate has notches at 51 slidably receiving the depending guides 52 on the cylinder 33 which prevent relative rotary movement of the parts.

Between the spaced lugs 53 and 54 are seats 56 and 57 for the second pair of lugs 58 and 59 projecting upwardly from the pressure plate 50 into contact with the underside of the plate 55.

The guides 52 have terminal apertures 52' adapted to receive locking pins underlying the edge of the pressure plate adjacent the notches for loosely securing the cylinder and parts in assembled relation.

In the absence of actuating pressure in the cylinder 33 the pressure plate 50 will ordinarily be resting upon and supported by the anti-friction thrust unit 60 which is mounted on the reduced portion 61 of the shaft 24, this unit including the washer or collar 62, bearing against the upper face of the sleeve 25 which carries the helical gear 28. Normally, the angle between the helical gears would cause the gear 28 to rise under driving conditions. When pressure is introduced into the cylinder through the pipe connection 63 from pressure conduit 64, this pressure reacts against piston 35 moving it downward.

Assuming a condition in which a 150 pound pressure to the square inch is employed, with a cylinder of the proportions shown, the total downward force exertable by the piston may be, for example, in the nature of 1500 pounds, reacting downwardly through the lugs 36 and 37 against the abutment terminii or operating ends 38 and 39 of the levers 40 and 41. The piston movement effected by this pressure will tilt the levers about their fulcrumed ends toward the position indicated in Figure 7. Due, however, to the fact that the respective levers are fulcrumed at their outer ends 42—43 and 53—54 and that the leverage reaction is against the lugs 48—49 and 58—59 on the pressure plate 50, there is initially about a 5 to 1 amplification of the force exerted so that a basic 150 pound hydraulic pressure, during the fulcruming of the levers, will produce a downward force reaction of about 7,500 pounds as respects the pressure plate 50. This force is exerted until the levers are tilted to an extent that the lower abutment edges of the portions 38 and 39 are brought into direct contact or engagement with the upper face of the pressure plate 50 at which point the amplifying leverage effect during the power stroke of the piston, will cease. Thereafter, the piston pressure will be transmitted directly from the piston lugs 36 and 37 to the lever ends and by their direct contact to the plate 50, thus reducing the effective pressure to one-fifth the previous amount. This creates a condition of maintained downward pressure on the gear 28 holding the parts in steady position but with a pressure effect insufficient under normal operating conditions to cause additional downward movement of the gear 28 in opposition to its tendency to rise as created by the drive reaction of the opposed helixes of the intermeshing teeth of the gears 28 and 29. Thus, a stabilized condition is reached without causing undue locking up of the pinions 23 and 31 with the rack 17. By threading the cylinder 33 upwardly or downwardly with respect to the support 10, its stabilized position and that of its fulcrum points may be varied or variably determined as desired, and a definite high pressure limiting position establshed without the necessty of employment of specific limiting stops, shoulders or the like, which, however, can be additively or alternatively utilized if desired.

In determining the proper adjusted position for the cylinder 33, the linkage may be tilted to its stabilized position by introduction of a screw 65, as shown in Figure 6, through the pipe connection 63 and the screw adjusted to urge the levers and pressure plate into the expanded position relative to cylinder 33 such as shown in Figure 7. With the parts so expanded the cylinder is screwed down until the desired tightness of the backlash eliminating mechanism is effected, after which the screw is removed and the conduit 64 connected to provide the hydraulic actuating pressure within the cylinder 33. Alternatively, or when the machine is in use the adjustment may be made with the hydraulic pressure on in the cylinder which will then have the same effect of displacement of the levers with high pressure reaction on the pressure plate 50 until the desired transmission backlash takeup has been effected when the cylinder is locked in its adjusted position as by the lock device 34.

As has been previously mentioned, one of the advantages of the present construction is the fact that by relief of hydraulic pressure in the cylinder 33 the pressure plate is rendered freely movable so that the sleeve 25 may be cammed upward by the gear 28 a sufficient amount to release the opposing reaction of pinion 31 to pinion 23, thus facilitating free rapid traverse or high speed movement of the transmission and table.

A suitable control circuit for the machine in this respect has been diagrammatically indicated in Figure 8. In the circuit, as illustrated, use is made of the pair of pressure pumps 66 and 67 discharging into the conduits 68 and 69 at pressures determined by the relief valves 70 and 71. Pressure from pump 66 is connected by conduit 68 with the reversing valve casing 72 containing the reversing valve 73. In the position shown, this pressure goes by way of cannelure 74, conduit 75 to groove 76 of the traverse control valve casing 77 containing valve 78. Groove 76 is coupled with cannelure 79 in the valve, and conduits 80 and 81 extend from this cannelure to one side of the hydraulic motor 17'.

The opposite side of the motor is connected by conduits 82 and 83 by way of cannelure 84, conduit 85, and cannelure 86 to the exhaust reservoir return conduit system 87. The position of the valves 73 and 78 is determined by a four-position control lever 88. When this lever is shifted to effect upward axial movement of valve 73 the pressure and exhaust conduit connections are interchanged to reverse the direction of actuation of the motor 17'. When the lever is moved to shift valve 78 axially from the upper position shown to its lower position, as indicated by the dotted line in Figure 8, conduits 81 and 82 are interconnected or short-circuited, conduit 83 remains connected to reservoir while the conduit connection 68—80 is uninterrupted. The construction of the motor is such that with this conduit connection the motor will be operated at a high or rapid traverse speed for effecting rapid movement of the table in a direction determined by the particular existing adjustment of the reversing valve 73. An additional effect, however, is produced by the shifting of the valve 78. In the position shown in full lines in the drawings conduit 69 is connected by cannelure 89 to conduit 64 so that the pressure developed by pump 71 is reacting against piston 35 for backlash elimination as has been previously described. Upon downward movement of the valve 78, however, conduit 64 is then connected with conduit 87a forming a part of the reservoir or return system so that the pressure is disconnected and the backlash pressure plate and associated parts are free to assume the relationship shown, for example, in Figure 6 of the drawings.

From the foregoing description taken in connection with the drawings it will be noted that there has been provided a simple and extremely efficient backlash eliminating mechanism of particular utility in connection with machine tools such as milling machines in which automatically and concurrently with the selection of feed or rapid traverse for the machine, the backlash mechanism is rendered effective or ineffective; and in which a high pressure up to a predetermined effective limit point can be satisfactorily established in said mechanism definitely and positively to move the transmission parts into a selected relationship when elimination of the backlash is desired, which position is readily adjustable and from which the retaining means may be simply and readily released concurrently with the change of the drive from feed to rapid traverse.

It will further be noted that in the mechanism as shown slight incremental adjustments of the final effective position may be made while the machine is in operation and under effective backlash eliminating pressure, and the relationship of the parts and their operation is such that when the backlash control is under pressure the reduction from the high positioning pressure effect to the lower yieldable retaining pressure is effected automatically without the employment of additional valving or the like, and, if desired, without strain on mechanical stops or other movement limiting devices.

Particular attention is invited to the fact that the specific combination and arrangement of parts as illustrated in Figure 3 has the advantage of backlash elimination throughout the entire drive transmission. For example, when the worm 19 is rotated to impart a counterclockwise driving movement to the pinion 23 and the backlash mechanism is effective the pressure produced tending to effect clockwise rotation of the pinion 31 reacts in a counterclockwise direction against the worm gear 21 firmly maintaining the teeth of this gear against the teeth of the worm in opposition to the pressure of the teeth of worm gear 20 against the other side of the teeth of the worm so that there is in effect a closed mechanical circuit from rack teeth 17 and pinion 23 by way of the worm gears 20 and 21 and intermediate driving worm 19 and the pressure tightened gears 28, 29 back through pinion 31 to the rack teeth 17, thus eliminating all looseness or play between the driving worm, the driven worm gears and the ultimate rack controlling pinions 23 and 31, reducing to a maximum degree the possibility of any undesired movement of the table 14 during feeding or milling operations.

What is claimed is:

1. In a backlash eliminator for a machine slide driving mechanism having a first and second pinion engaging a rack on a machine slide mounted on a support, and a first and second pinion shaft supporting the respective pinions in engagement with the rack, the combination of power actuating means for said mechanism including a power rotatable worm, worm gears intermeshing therewith for simultaneous rotation in opposite directions, one of said worm gears being operatively connected to the first pinion shaft for rotating the first pinion, a third shaft supporting the other worm gear, a pair of helical gears connecting said third shaft with said second pinion shaft for rotating said second pinion in the same direction as the first pinion, means for shifting one of said helical gears axially relative to the other to effect a directional reaction between said helical gears commensurate with said axial movement, said reaction reversing the second pinion relative to the first pinion to eliminate backlash between said pinions and rack, and said reaction also reversely moving said other worm gear in relation to said one worm gear to eliminate backlash between said worm and worm gears.

2. In a backlash eliminator for a machine slide driving mechanism having a first and second pinion engaging a rack on a machine slide mounted on a support, and a first and second pinion shaft supporting the respective pinions in engagement with the rack, the combination of power actuating means for said mechanism including a power rotatable worm, worm gears intermeshing therewith for simultaneous rotation in opposite directions, one of said worm gears being operatively connected to the first pinion shaft for rotating the first pinion, a third shaft supporting the other worm gear, a pair of helical gears connecting said third shaft with said second pinion shaft for rotating said second pinion in the same direction as the first pinion, means for shifting one of said helical gears axially relative to the other to effect a directional reaction between said helical gears commensurate with said axial movement, said reaction reversing the second pinion relative to the first pinion to eliminate backlash between said pinions and rack, and said reaction also reversely moving said other worm gear in relation to said one worm gear to eliminate backlash between said worm and worm gears, and means to limit the amount of axial movement between the helical gears to control the tightness of all of said gearing.

3. In a backlash eliminator for a machine slide driving mechanism having a first and second pinion engaging a rack on a machine slide mounted on a support, and a first and second pinion shaft supporting the respective pinions in engagement with the rack, the combination of power actuating means for said mechanism including a power rotatable worm, worm gears intermeshing therewith for simultaneous rotation in opposite directions, one of said worm gears being operatively connected to the first pinion shaft for rotating the first pinion, a third shaft supporting the other worm gear, a pair of helical gears connecting said third shaft with said second pinion shaft for rotating said second pinion in the same direction as the first pinion, power means for shifting one of said helical gears axially relative to the other to effect a directional reaction between said helical gears commensurate with said axial movement, said reaction reversing the second pinion relative to the first pinion to eliminate backlash between said pinions and rack, and said reaction also reversely moving said other worm gear in relation to said one worm gear to eliminate backlash between said worm and worm gears, said power means including a power actuated piston, and means for limiting the power stroke of said piston to control the tightness of said gearing.

4. In a backlash eliminator for a machine slide driving mechanism having a first and second pinion engaging a rack on a machine slide mounted on a support, and a first and second pinion shaft supporting the respective pinions in engagement with the rack, the combination of power actuating means for said mechanism including a power rotatable worm, worm gears intermeshing therewith for simultaneous rotation in opposite directions, one of said worm gears being operatively connected to the first pinion shaft for rotating the first pinion, a third shaft supporting the other worm gear, a pair of helical gears connecting said third shaft with said second pinion shaft for rotating said second pinion in the same direction as the first pinion, power means for shifting one of said helical gears axially relative to the other to effect a directional reaction between said helical gears commensurate with said axial movement, said reaction reversing the second pinion relative to the first pinion to eliminate backlash between said pinions and rack, and said reaction also reversely moving said other worm gear in relation to said one worm gear to eliminate backlash between said worm and worm gears, said power means including a piston and pressure plate supported by one of said helical gears and means interposed between the piston and plate for varying the force transmitted to the plate by the piston.

5. In a backlash eliminator for a machine slide driving mechanism having a first and second pinion engaging a rack on a machine slide mounted on a support, and a first and second pinion shaft supporting the respective pinions in engagement with the rack, the combination of power actuating means for said mechanism including a power rotatable worm, worm gears intermeshing therewith for simultaneous rotation in opposite directions, one of said worm gears being operatively connected to the first pinion shaft for rotating the first pinion, a third shaft supporting the other worm gear, a pair of helical gears connecting said third shaft with said second pinion shaft for rotating said second pinion in the same direction as the first pinion, power means for shifting one of said helical gears axially relative to the other to effect a directional reaction between said helical gears commensurate with said axial movement, said reaction reversing the second pinion relative to the first pinion to eliminate backlash between said pinions and rack, and said reaction also reversely moving said other worm gear in relation to said one worm gear to eliminate backlash between said worm and worm gears, said power means including a piston, a pressure plate supported by one of said helical gears, and means interposed between the piston and plate including a tiltable pressure lever having one end fulcrumed in the support, the other end engaged by the piston and an intermediate point engaging the pressure plate for amplifying the pressure force against the plate as respects any actuating force applied to the piston.

6. In a backlash eliminator for a machine slide driving mechanism having a first and second pinion engaging a rack on a machine slide mounted on a support, and a first and second pinion shaft supporting the respective pinions in engagement with the rack, the combination of power actuating means for said mechanism including a power rotatable worm, worm gears intermeshing therewith for simultaneous rotation in opposite directions, one of said worm gears being operatively connected to the first pinion shaft for rotating the first pinion, a third shaft supporting the other worm gear, a pair of helical gears connecting said third shaft with said second pinion shaft for rotating said second pinion in the same direction as the first pinion, power means for shifting one of said helical gears axially relative to the other to effect a directional reaction between said helical gears commensurate with said axial movement, said reaction reversing the second pinion relative to the first pinion to eliminate backlash between said pinions and rack, and said reaction also reversely moving said other worm gear in relation to said one worm gear to eliminate backlash between said worm and worm gears, said power means including a piston, a pressure plate supported by one of said helical gears, a cylinder carried by the support in which said piston is movable, means interposed between the piston and plate including a pressure lever having one end fulcrumed in the support, the other end engaged by the piston and an intermediate point thereon engaging the plate, means for admitting a predetermined pressure to said cylinder to effect actuation of the lever by the piston and thereby impart an amplified force to the pressure plate until the operating end of the lever engages the plate whereby the plate will be held only by said predetermined pressure.

7. In a backlash eliminator for a machine slide driving mechanism having a first and second pinion engaging a rack on a machine slide mounted on a support, and a first and second pinion shaft supporting the respective pinions in engagement with the rack, the combination of power actuating means for said mechanism including a power rotatable worm, worm gears intermeshing therewith for simultaneous rotation in opposite directions, one of said worm gears being operatively connected to the first pinion shaft for rotating the first pinion, a third shaft supporting the other worm gear, a pair of helical gears connecting said third shaft with said second pinion shaft for rotating said second pinion in the same direction as the first pinion, power means for shifting one of said helical gears axially relative to the other to effect a directional reaction between said helical gears commensurate with said axial movement, said reaction reversing the second pinion relative to the first pinion to eliminate backlash between said pinions and rack, and said reaction also reversely moving said other worm gear in relation to said one worm gear to eliminate backlash between said worm and worm gears, said power means including a piston, a pressure plate supported by one of said helical gears, and means interposed between the piston and plate for amplifying the force exerted by the piston on the plate including a pair of crossed tiltable pressure levers, each having one end fulcrumed in the support and the other end engaged by the piston, said levers each having an intermediate abutment for engaging the plate.

8. In a backlash eliminator for a machine slide driving mechanism having a first and second pinion engaging a rack on a machine slide mounted on a support, and a first and second pinion shaft supporting the respective pinions in engagement with the rack, the combination of power actuating means for said mechanism including a power rotatable worm, worm gears intermeshing therewith for simultaneous rotation in opposite directions, one of said worm gears being operatively connected to the first pinion shaft for rotating the first pinion, a third shaft supporting the other worm gear, a pair of helical gears connecting said third shaft with said second pinion shaft for rotating said second pinion in the same direction as the first pinion, power means for shifting one of said helical gears axially relative to the other to effect a directional reaction between said helical gears commensurate with said axial movement, said reaction reversing the second pinion relative to the first pinion to eliminate backlash between said pinions and rack, and said reaction also reversely moving said other worm gear in relation to said one worm gear to eliminate backlash between said worm and worm gears, said power means including a piston, a pressure plate supported for actuation by the piston, a cylinder carried by the support in which the piston is movable, a pair of crossed tiltable pressure levers, each having one end fulcrumed on the cylinder, means on the piston engaging the non-fulcrumed ends of the levers, means operatively connecting one of said helical gears to the pressure plate for axial movement of the helical gear when the pressure plate is actuated by the piston, spaced abutment means between the plate and the levers engaging the respective levers adjacent the fulcrumed ends of the levers for imparting amplified pressure forces against the plate as respects any pressure force applied to the piston, each of said levers being Y-shaped and having a pair of diverging arms, the ends of the diverging arms of the Y's being fulcrumed and the stem of each Y extending between the diverging arms of the other Y, the piston having lugs projecting between the diverging arms of the levers into engagement with the stems of the levers for tilting the levers about the fulcrumed arms.

9. In a machine tool having a slide with a rack thereon and a source of power, a mechanism for coupling said power source to the slide for movement thereof without backlash comprising a first and second pinion engaged with said rack, a first and second pinion shaft engaged, respectively, with said pinions, a worm connected to said power source for rotation thereby, worm gears intermeshing with the worm for simultaneous rotation in opposite directions, one of said worm gears being operatively connected to the first pinion shaft for rotating the first pinion, means including a pair of helical gears for operatively connecting said other worm gear to said second pinion shaft, and means for shifting one of said helical gears axially relative to the other to urge the helical gears to rotate, the second pinion thereby being urged to rotate in a direction opposite to the direction of rotation of said first pinion to eliminate backlash between said pinions and the rack, and said other worm gear thereby being urged to rotate in a direction opposite the direction of rotation of said one worm gear to eliminate backlash between the power rotated worm and the worm gears.

10. In a machine tool having a movable member with a rack thereon and a power driven shaft, the combination of a first and second pinion engaged with said rack, a first and second pinion shaft engaged, respectively, with said pinions, a pair of gears operatively engaged with said driven shaft for simultaneous rotation in opposite directions, one of said gears being operatively connected to the first pinion shaft for rotating the first pinion, means including a pair of helical gears for operatively connecting said other gear to said second pinion shaft, and means for shifting one of said helical gears axially relative to the other.

References Cited in the file of this patent

UNITED STATES PATENTS

| | | |
|---|---|---|
| 2,026,347 | Johnson | Dec. 31, 1935 |
| 2,070,807 | Roehm et al. | Feb. 16, 1937 |
| 2,254,784 | Silven | Sept. 2, 1941 |
| 2,651,207 | Olson | Sept. 8, 1953 |

FOREIGN PATENTS

| | | |
|---|---|---|
| 543,538 | Germany | Feb. 6, 1932 |